(12) United States Patent
Schwoerer et al.

(10) Patent No.: US 7,552,161 B2
(45) Date of Patent: Jun. 23, 2009

(54) MULTI-STREAM FFT FOR MIMO-OFDM SYSTEMS

(75) Inventors: Ludwig Schwoerer, Hattingen (DE); Ernst Zielinski, Dortmund (DE)

(73) Assignee: Nokia Corporation, Espoo (FI)

( * ) Notice: Subject to any disclaimer, the term of this patent is extended or adjusted under 35 U.S.C. 154(b) by 364 days.

(21) Appl. No.: 10/588,895

(22) PCT Filed: Jun. 30, 2005

(86) PCT No.: PCT/IB2005/001867

§ 371 (c)(1), (2), (4) Date: Aug. 10, 2006

(87) PCT Pub. No.: WO2007/003977

PCT Pub. Date: Jan. 11, 2007

(65) Prior Publication Data

US 2008/0256159 A1    Oct. 16, 2008

(51) Int. Cl.
*G06F 17/14* (2006.01)
(52) U.S. Cl. .................................................. 708/404
(58) Field of Classification Search .......... 708/400–409
See application file for complete search history.

(56) References Cited

U.S. PATENT DOCUMENTS

| | | |
|---|---|---|
| 2004/0059766 A1 | 3/2004 | Yeh |
| 2004/0136349 A1 | 7/2004 | Walton et al. |
| 2004/0252632 A1 | 12/2004 | Bourdoux et al. |
| 2006/0167964 A1* | 7/2006 | Balakrishnan et al. ...... 708/404 |

OTHER PUBLICATIONS

Shousheng He et al., "A New Approach to Pipeline FFT Processor", Apr. 15, 1996, Parallel Processing Symposium, Proceedings of IPPS '96, pp. 766-770.

* cited by examiner

*Primary Examiner*—Tan V Mai
(74) *Attorney, Agent, or Firm*—Squire, Sanders & Dempsey L.L.P.

(57) ABSTRACT

The present invention proposes a signal processor for Fast Fourier Transformation, FFT, of $M_R$, $M_R>1$, input data streams of $2^k$ samples each, supplied in parallel. After multiplexing the input data streams in an interlaced manner, the resulting stream is subjected to FFT. The FFT device has a pipeline architecture composed of k stages with a respective feedback path including a single delay element per each stage of the pipeline architecture. The delay element and timing signals are adapted to cope with FFT processing of the multiplexed streams using the single FFT device only. After processing, the FFT processed data stream is demultiplexed. The present invention also concerns a corresponding signal processing method.

19 Claims, 15 Drawing Sheets

Fig. 11 Control Signaling

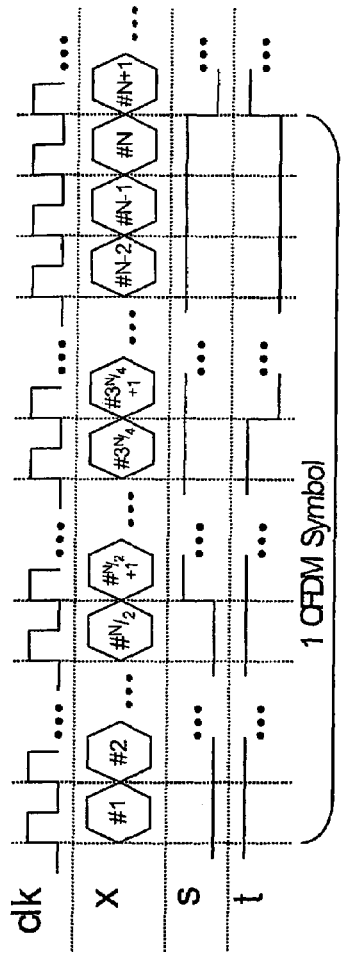
Fig. 12A
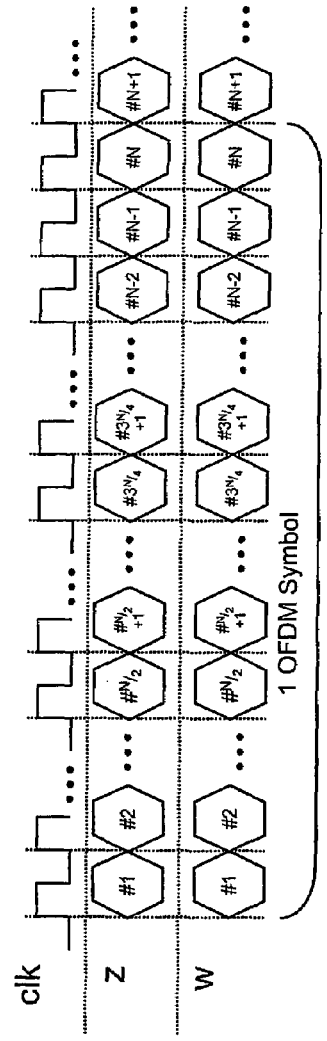
Fig. 12B
Timing Diagram (Conventional Structure)
Fig. 12

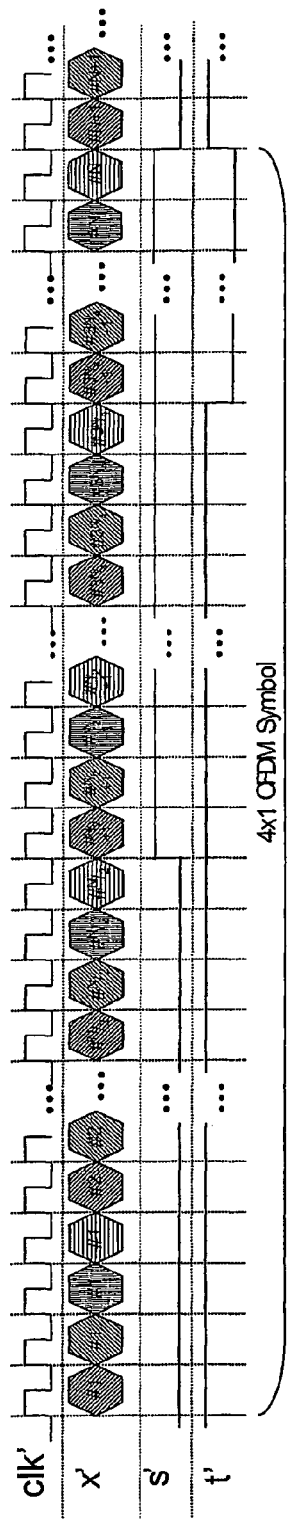
Fig. 13A
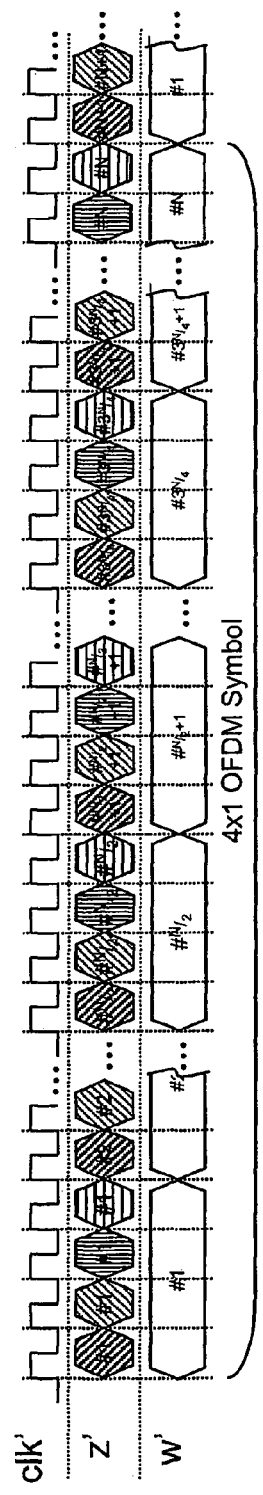
Fig. 13B
Timing Diagram acc. to invention
Fig. 13

MULTI-STREAM FFT FOR MIMO-OFDM SYSTEMS

FIELD OF THE INVENTION

The present invention relates to a processor and method for subjecting multiple parallel input data streams to Fast Fourier Transformation, FFT.

BACKGROUND OF THE INVENTION

By using Fast Fourier Transformation, the Discrete Fourier Transform can be obtained. This is important in many signal processing scenarios.

In particular in, for example, mobile communication scenarios, the FFT is required to be obtained for various purposes. Conventionally, in case a single data stream is to be subjected to FFT transformation, various scenarios for accomplishing this are known. A single data stream is often referred to as SISO, "Single Input Single Output". As a typical SISO scenario, one might consider a case in which a communication network entity such as a base station or Node_B transmits via a single antenna or antenna element data to a mobile station or user equipment with one antenna element (or vice versa).

On the other hand, with further developments in communication technology, scenarios are implemented and under investigation which apply multiple antenna elements for transmission and for reception. In such cases, a so-called "Multiple Input Multiple Output", MIMO, concept is present. MIMO concepts are often applied in connection with Orthogonal Frequency Division Multiplex, OFDM, systems.

MIMO-OFDM (multiple-input-multiple-output orthogonal frequency division multiplex) systems offer remarkable increase in link reliability and/or in data rate. However, this new technique suffers on higher complexity of the hardware. For this reason, there is a need of clever strategies to reduce the expenditure of hardware.

Apparently, with multiple input data streams being present simultaneously, i.e. in parallel, also those multiple data streams have to be subjected to FFT. This imposes a certain problem in terms of processing load, processing speed, and/or complexity for the signal processing methods and hardware used for this purpose.

The FFT transformation is a central process in conventional OFDM (SISO-OFDM: single-input-single-output OFDM) systems. The transition to MIMO technique results in an OFDM system with several FFT transformation processes in parallel. For instance, MIMO systems with four receiver antenna elements need four FFT transformations. In straightforward solutions, there have to be installed four FFT processing blocks. This leads to much higher hardware complexity. Hence, there is a need for a new implementation strategy of the FFT for MIMO systems.

He and Torkelson have presented "A new approach to Pipeline FFT processor" in IEEE Proceedings of IPPS '96, 1996, pp. 766 to 770. This document introduces various pipeline FFT processors for SISO scenarios.

For better understanding of the present invention to be described hereinafter, a brief review and introduction of the FFT pipeline architecture as presented by He and Torkelson is given hereinafter. A particular usable FFT is briefly introduced to obtain an idea of the main structure and its properties.

To this end, the SISO Radix $2^2$ single-path delay feedback (SDF) architecture proposed by He & Torkelson will be considered. This architecture is also referred to as R2$^2$SDF.

FFT for SISO Systems According to He & Torkelson

As mentioned, a structure of the FFT algorithm was proposed, where a Radix $2^2$ single-path delay feedback (SDF) architecture is used. Because of the SDF, the spatial regularity of the resulting architecture/signal flow graph could be exploited. The resulting hardware requirement is minimal on both dominant components: complex multipliers and complex data memory.

For a hardware-oriented implementation, this approach combines the advantage of the signal flow graph, SFG, of radix 4 and radix 2 approaches. The SFG radix 4 requires minimum of non-trivial multipliers, whereas the SFG radix 2 uses a simple butterfly structure.

FIG. 1 illustrates the resulting signal flow graph structure for N=16 (16 points FFT), i.e. a received data stream to be subjected to FFT is assumed to comprise N=16 samples (N samples forming one symbol). Trivial multiplications denoted by the multiplier "-j" appear between a first, BF I, and a second, BF II, stage of the SFG. At the first stage, a simple butterfly structure is used. Then, in the second stage, the same calculation process is realized. And additionally, the last. N/4=4 outputs of the first stage BFI are multiplied by -j. Assuming a complex number Z=R+j*I with R denoting the real component and I denoting the imaginary component, a multiplication by "-j" will then lead to -j*Z=-j*R+I. Apparently, the real and imaginary parts are exchanged and the imaginary part is inverted in terms of the sign. Therefore, this multiplication is regarded as trivial (real-imaginary swapping and sign inversion). These operations are indicated by diamonds symbols in FIG. 1. After these two stages, full multipliers are required to compute the product of the decomposed twiddle factor. The multipliers perform a multiplication with multiplication factors W (twiddle factors). Twiddle factors are those coefficients applied to results from a previous stage to combine these in order to form inputs of a next stage.

Applying the Common Factor Algorithm, CFA, procedure recursively to the remaining DFT's (Discrete Fourier Transforms) of lengths N/4, the complete radix $2^2$ DIF FFT algorithm is obtained, as shown in FIG. 2. As an explanatory remark, using such an approach, a number of N=16 data sets (samples) of an incoming stream is decomposed in a pipeline fashion into a succession of stages $\log_2 N=4$. That is, for N=16 data samples, a 4 stage FFT SFG and/or architecture will result (total number of stages k=4 in this example). A respective i-th stage (i=1 ... 4) is designed to process a number of data sets of $2^{(\log_2 N+1-i)}$. Thus, the first stage (i=1) BF I receives/processes 16 data samples, and the fourth stage (i=4) BF IV receives/processes 2 data samples.

Architecture

In the following, the architecture will be described with reference to a DFT example for N=16 samples.

As shown in FIG. 2, the FFT structure for N=16 data samples has four butterfly stages BFI, ..., BFIV. Note that BFI, ... BF IV denote the stages and do not denote the BF types employed in a respective stage. There can be seen that the non-trivial multipliers are between the second, BFII, and the third stage, BFIII, according to the signal processing order. In addition, the rotations (trivial multiplications) by -j are done after the first, BFI, and after the third, BFIII, stage. FIG. 3 illustrates the resulting pipeline architecture. The blocks above the butterfly structures indicate FIFO memories and the numbers indicated therein the delay imposed thereby, i.e. number of samples buffered by these.

The FIFO memories are located in the single delay feedback path of the structure. FIFO memories are particularly useful in terms of hardware, but the FIFO property could also be realized by another memory type in combination with appropriate addressing of the memory in order to read out the stored data in FIFO fashion.

For instance, the FIFO in the first stage after the input port has the length of 8 symbols. Apparently, the number of delay elements, i.e. the number of samples buffered in the feedback path of a i-th stage out of k stages is N/2 for i=1, N/4 for i=2, N/8 for i=3, and N/16 for i=4, and can generally be expressed as $N/2^i$ for an i-th stage. The data control for the butterflies is indicated by the bar on the bottom of the figure, which schematically indicates control signals supplied to the four stages 1 . . . 4 of the pipeline architecture. Butterfly stages of type I (BF2I) receive a single control signal only and are applied in stages i=1 and i=3, and Butterfly stages of type II (BF2II) receive two control signals and are applied in stages i=2 and i=4. The twiddle factors W(n) are for example read out from a memory (not shown in FIG. 3) with appropriate timing. The timing of the control signals supplied to BF2I and BF2II stages as well as for twiddle factor generation/supply depends on the clock rate of the FFT device.

The internal structure of the respective butterfly stage is shown in FIG. 4 (BF2I) and FIG. 5 (BF2II). Note that input and output ports are divided into a real (index r) and imaginary (index i) part. N denotes the number of symbols contained in the stream to be subjected to FFT processing and n is an index variable with $1 \leq n \leq N$. (The memory "capacity" of e.g. the FIFO in the feedback path depends on the stage index i with $1 \leq i \leq k$.)

FIGS. 11A and 12 show details of the data control in terms of control signals applied and timing relations there between, as will be described later on.

The calculation process at each stage is done in two steps.

In the first step (control signal s=0), the data sequence x(n) (n=1 . . . 16/2) is read at the input ports $x_r(n+N/2)/x_i(n+N/2)$ and is directly written to the ports $Z_r(n+N/2)/Z_i(n+N/2)$ which are connected to the FIFO. At the same time, the FIFO content is read at the ports $x_r(n)/x_i(n)$ and is directly written, as the other output port pair, to the ports $Z_r(n)/Z_i(n)$ which are connected to the next pipeline stage.

In the second step (control signal s=1), after N/2=8 symbols, the stored data and the remaining input symbols x(n) (n=9 . . . 16) are used to compute the stage output where one half is written to the next stage (ports $Z_r(n)/Z_i(n)$) and the other half is stored in the FIFO memory (ports $Z_r(n+N/2)/Z_i(n+N/2)$).

To accomplish such processing, the internal structure uses adders/subtractors and internal signal feeding paths as shown in FIG. 4. In addition, supplying the signals to FIFO memory and/or next stage Butterfly stage is accomplished using switches under control of the control signal s. The operational condition of a respective switch is denoted by 0 and/or 1 which represents the respective state of the control signal s applied in order for the switch to be in the respective operational condition. An adder is illustrated by the encircled "+", a subtractor is illustrated by the encircled "+" with an additional subscript "−".

The calculation process of the butterfly stage BF2II differs from the one done in BF2I a little. Since these stages additionally include the j rotations, i.e. the "trivial" multiplications by "−j", the real and imaginary parts of input signals have to be swapped. In addition, the signs have also to be changed as shown in FIG. 5. This is controlled by the signal t. The negated signal t is logically combined in an AND gate with the signal s and controls the swapping paths at the input terminals xr(n+N/2), xi(n+N/2) as well as the adders/subtractors in the signal paths associated to the signals xi(n) and xi(n+N/2). Thus, for s=1 and t=0 there occurs a swapping and conversion of the adder, else there is no swapping and conversion of the adder. The remaining process and architecture is equal to the BFI process.

FIG. 11A shows details of control signals with a corresponding timing relation being illustrated in FIG. 12.

As shown in FIG. 11A, a clock signal clk is supplied to the (FIFO) memory, a twiddle factor generation means (e.g. including a memory from which the factors are read out) and the BF2II stage. A signal supplied to the BF2II stage from a preceding stage is denoted with x, and signals s and t as explained before are also supplied. A signal leaving the BF2II stage to a subsequent multiplier is denoted with z and supplied to the multiplier for multiplication with a twiddle factor w. Afterwards, the multiplied signal is forwarded to the next stage (not shown in FIG. 11A). (Note that substantially the same holds for a stage of type BF2 I, with the difference that the control signal t is not applied and that a signal z leaving a stage of BF2I type will be supplied to a BF2II stage (input signal x) and not to multiplier performing multiplication with twiddle factors).

FIG. 12 shows the timing relation there between. In the lower part of FIG. 12, the signals z, w and clk are supplied in synchronism with each other. With each clock cycle clk, a new signal z is supplied to the multiplier which is in synchronism therewith supplied with a corresponding weight (twiddle) factor w. In the upper part of FIG. 12 it is shown that a sample x of a sequence of 1 . . . N samples (forming one OFDM symbol) is supplied with each clock cycle clk. Initially, the signal s assumes a low level (s=0) for the first N/2 samples. Thereafter, starting with sample N/2+1, it assumes a high level until N samples have been supplied. (Thereafter, a new OFDM symbol sequence starts and s=0). As to the signal t, this signal assumes a high level for the first 3*N/4 samples and changes afterwards (starting with sample 3/4*N+1) for the last N/4 samples to the low level.

Finally, Table 1 shows the complexity of this prior art FFT architecture, which is used in the further development of the multi-stream transformation for MIMO-OFDM systems.

TABLE 1

Computational Complexity of the FFT.

| | Multiplier | Adder | Memory Size | Control |
|---|---|---|---|---|
| R2²SDF | $Log_4 N_{FFT} - 1$ | $4Log_4 N_{FFT}$ | $N_{FFT} - 1$ | Simple |

FFT for MIMO Systems

Now, two straightforward architecture alternatives are presented for MIMO systems based on this FFT structure. Notwithstanding this, other FFT structures could be used. In the following, the previously described FFT structure (R2²SDF) is implemented for MIMO systems. There are two possible strategies to realize the transformation process for $M_R$ antenna system, i.e. systems having a number of $M_R$ antennas.

FIG. 6 shows a full parallel implementation with a FFT block per each data stream to be transformed. Thus, on the one hand, a number $M_R$ of FFT blocks can be implemented, i.e. one for each stream (see FIG. 6 for the example of $M_R$=4). It can be seen that the complexity of such a system grows linearly with the number of antennas (i.e. $M_R$ times one FFT complexity).

On the other hand, to reduce the complexity of the system, the transformation process can be done successively by a smaller number ($M_{FFT}$) of FFT blocks (straightforward successive FFT solution). In order to transform successively $M_R$ parallel streams, the FFT has (or the FFTs have) to work at a higher rate. Because of the used FFT pipeline structure, the frequency can be increased arbitrarily.

FIG. 7 illustrates such a successive transformation process for $M_R=4$ and $M_{FFT}=1$, i.e. using a single FFT only. Due to this processing, the input streams are multiplexed upstream of the FFT using a multiplexer MUX and demultiplexed using a demultiplexer DeMUX after, i.e. downstream the FFT. This strategy results in a reduction of computational complexity, depending on the sharing ratio ($M_R/M_{FFT}$). Unfortunately, each stream requires an additional input buffer that collects one OFDM symbol before sending it to the FFT.

FIG. 8 illustrates the timing of signal processing of this structure as shown in FIG. 7. In a first step, $N_{FFT}$ symbols of each stream (example: number of streams $M_R=4$) are written to the corresponding stream buffer. Due to the $M_R$ streams arriving in parallel, the $M_R$ buffers are simultaneously getting filled. Finally, after the buffering period, each buffer successively shifts its content into the FFT block, which works at a higher rate. Since the buffer content of the streams is used sequentially and new data symbols are continuously fed to the FFT at the same time, another buffer (not shown) is needed.

In a first buffer area I, samples of $M_R$ data streams are buffered. Assuming a multiplexing sequence of $M_R$ streams 1 . . . 4, the samples of stream 1 are used as FFT input first.

In the meantime, further data samples of following symbols are buffered in a buffer area II for streams 2 . . . 4. Samples of stream 2 will be subjected to FFT processing next, which is the reason why buffer area II for stream 2 will not fill too much. Since streams 3 and 4, respectively, will be subjected to FFT processing pre-last or last, respectively, the respective buffer area II for these streams will be filled to a greater extent. The indication of multiples of $N_{FFT}$ indicate the additional amount of buffer memory required for buffer area II.

The need and the size for the additional buffer area can also be seen at the time axis t in FIG. 8. At the time when the first sequence is fed into the FFT, the incoming values of the remaining sequences have to be buffered until the FFT block has finalized the input process for the first sequence. For the second sequence for $M_R=4$, the FFT is able to read the next sequence after $N/M_R=0.25N$ time steps. This results in an absolute value of $t=1.25N$. For the $3^{rd}$ and $4^{th}$ sequences, the waiting or buffer time is $2N/M_R=0.5N$ (absolute: $t=1.5N$) and $3N/M_R=0.75N$ (absolute: $t=1.75N$). Consequently, the data input for all sequence is finalized after N time steps and at the time $t=2N$ the next OFDM symbol period begins.

Assuming an FFT processing rate of four times higher compared to the symbol rate, the additional memory size for buffering is $$\frac{1}{2}\left(\frac{M_R^2}{M_{FFT}} - M_R\right)\frac{N_{FFT}}{4} \qquad \text{Eq. (1)}$$

In addition, the FFT uses a memory in the size of $N_{FFT}-1$. Thus, the overall memory size (complex symbols) is given by $$\underbrace{M_R N_{FFT}}_{BufferI} + \underbrace{\left(\frac{M_R^2}{M_{FFT}} - M_R\right)\frac{N_{FFT}}{8}}_{BufferII} + \underbrace{(N_{FFT} - 1)M_{FFT}}_{FFT} \qquad \text{Eq. (2)}$$

For a system with four antennas ($M_R=4$) and one FFT ($M_{FFT}=1$), the above equation can be simplified to $$\underbrace{4N_{FFT}}_{BufferI} + \underbrace{1.5N_{FFT}}_{BufferII} + \underbrace{(N_{FFT} - 1)}_{FFT} = 6.5N_{FFT} - 1 \qquad \text{Eq. (3)}$$

For MIMO receivers with $M_R$ antennas, $M_R$ independent data symbol streams have to be transformed. Usually, according to the approach introduced with reference to FIG. 6, the data symbols are fed into $M_R$ FFT blocks. Especially for large FFT length, this results in highly complex system architectures.

As shown in the successive processing alternative introduced with reference to FIGS. 7 and 8, there is a possibility to reduce the architecture complexity up to a complexity of one FFT. Unfortunately, the memory consumption of this option increases from $4N_{FFT}-4$ (parallel FFTs solution) to $6.5N_{FFT}-1$ complex symbols.

SUMMARY OF THE INVENTION

Hence, it is an object of the present invention to provide an improved signal processor for FFT transformation as well as a corresponding method which is free from above mentioned drawbacks inherent to known approaches.

According to the present invention, this object is for example achieved by a signal processor for Fast Fourier Transformation, FFT, of $M_R$, $M_R>1$, input data streams supplied in parallel, comprising a multiplexing device having $M_R$ input terminals each receiving one of the $M_R$ input data streams and an output terminal at which the $M_R$ input data streams are output in a multiplexed manner, a Fast Fourier Transformation device configured to perform Fast Fourier Transformation of a data stream supplied at an input terminal thereof and to output the FFT transformed data stream at an output terminal thereof, the input terminal of the Fast Fourier Transformation device being connected to the output terminal of the multiplexing device, and a demultiplexing device having an input terminal connected to the output terminal of the Fast Fourier Transformation device and $M_R$ output terminals at which a respective one of $M_R$ transformed output data streams is output in a demultiplexed manner, characterized in that each of the $M_R$ input data streams contains a number of $N=2^k$ samples, the Fast Fourier Transformation device has a pipeline architecture composed of k stages with a respective feedback path including a single delay element per each stage of the pipeline architecture and is controlled by a first and second internal control signals, wherein the delay element in a feedback path of an $i^{th}$ stage, $1<=i<=k$, of the pipeline architecture imposes a delay of $M_R*N/2^i$ samples, the first internal control signal is clocked $M_R$ times faster compared to a clock rate at which the samples of the $M_R$ streams are supplied, and the second internal control signals are clocked $M_R$ times slower compared to the first internal control signal.

According to advantageous further developments of the signal processor, the multiplexing device is configured such that the $M_R$ input data streams are multiplexed per data sample of the input data streams and the demultiplexing device (DEMUX) is configured such that the transformed input data stream is demultiplexed per data sample of the transformed data stream;

a control signal supplied to the multiplexer and demultiplexer is clocked at a rate $M_R$ times the clock rate of the supplied streams;

the Fast Fourier Transformation device (FFT) has a Radix-2 Single-path Delay Feedback, $R^2$SDF, architecture;

the pipeline architecture of the Fast Fourier Transformation device is composed of Butterfly stages of types I and II;

the first stage of the pipeline architecture receiving the multiplexed data streams is a Butterfly stage of type I for even and odd total numbers of k.

According to the present invention, further a network element of a communication network comprising a signal processor according to any of the preceding aspects is concerned.

According to the present invention, further a terminal configured to communicate via a communication network, the terminal comprising a signal processor according to any of the preceding aspects is concerned.

Still further, according to the present invention, a system comprising at least one of a terminal according to any of the above aspects and a network element according to any of the above aspects is concerned.

Also, according to the present invention, a computer chip comprising at least a signal processor according to any of the preceding aspects is concerned.

According to the present invention, this object is for example achieved by a signal processing method for performing Fast Fourier Transformation, FFT, of $M_R$, $M_R>1$, input data streams supplied in parallel, comprising the steps of multiplexing the $M_R$ input data streams to a multiplexed data stream, performing Fast Fourier Transformation of the multiplexed data stream and outputting the transformed data stream, demultiplexing the transformed data stream to $M_R$ transformed output data streams, characterized by each of the $M_R$ input data streams contains a number of $N=2^k$ samples, performing FFT transformation using a pipeline of k stages with a respective feedback path imposing a delay on the samples per each stage of the pipeline and controlling the performing of the FFT transformation by a first and second internal control signals, and by imposing a delay of $M_R*N/2^i$ samples on the samples in the feedback path of an $i^{th}$ stage, $1<=i<=k$, of the pipeline, clocking the first internal control signal $M_R$ times faster compared to a clock rate at which the samples of the $M_R$ streams are supplied, and clocking the second internal control signals $M_R$ times slower compared to the first internal control signal.

According to advantageous further developments of the signal processing method,
- multiplexing is accomplished such that the $M_R$ input data streams are multiplexed per data sample of the input data streams and demultiplexing is accomplished such that the transformed data stream is demultiplexed per data sample of the transformed data stream;
- clocking to the multiplexer and demultiplexer is performed at a rate $M_R$ times the clock rate of the supplied streams;
- the Fast Fourier Transformation processing is based on a Radix-2 Single-path Delay Feedback algorithm;
- the pipeline of processing stages for the Fast Fourier Transformation is composed of Butterfly stages of types I and II (BF2I, BF2II);
- the first stage of the pipeline receiving the multiplexed data stream is a Butterfly stage of type I for even and odd total numbers of k.

Still further, according to the present invention, a computer program product for a computer, comprising software code portions for performing the steps of any one of the above method aspects when the program is run on the computer is concerned.

In this regard, the computer program product advantageously comprises a computer-readable medium on which the software code portions are stored.

According to the present invention, at least the following advantages can be achieved compared to pre-existing concepts:

The present invention concentrates on the Fast-Fourier transformation in MIMO-OFDM systems. The proposed FFT-structure and method enables a transformation process of several incoming data streams in parallel.

However, the present invention is not limited to OFDM systems but can be applied to other scenarios in which parallel input data streams are to be subjected to FFT. For example, it can be applied for frequency domain filtering at multiple antenna receiver or transmitter. For example, as examples of OFDM systems, it can be applied to WLAN systems or other communication systems such as those currently investigated and referred to as 3.9G and 4G radio communication systems.

The new multi-stream FFT structure offers a reduction of the computational complexity up to one FFT for all parallel data streams. On the contrary to the above introduced successive implementation, this strategy requires less memory ($4N_{FFT}-4$ complex symbols) at same computational complexity.

The proposed architecture combines the optimum properties of parallel and straightforward successive multi-stream FFT. The proposed architecture/method has the same computational complexity as the straightforward successive FFT solution. Thus, the gain is equal to the number of parallel streams ($M_R$) compared to the parallel solution. It has the same memory consumption as the parallel FFT solution. The difference to the straightforward successive solution is more than $2.5N_{FFT}$ complex symbol memory. The lower complexity results in lower costs. It can be realized with very little control "overhead" by merely adjusting buffer capacity in the feedback paths and adjustment of timing for the control signals.

The significant reduction of the number of FFT blocks results in a corresponding reduction of cost for MIMO systems. Thereby, about ⅓ of memory reduction compared to a successive implementation using $R2^2SDF$ pipeline architecture becomes possible by improved data processing timing and feedback path delay adjustment.

The concept underlying the present invention can be applied to all SDF pipeline FFT architectures with feedback delay elements in the single delay feedback path.

Together with an increased processing rate of the FFT a slight increase in power consumption is to be expected, if the FFT is for example implemented in CMOS technology. However, the particular hardware realization is not limited to CMOS, but other technology concepts known for implementing digital circuits are likewise applicable.

BRIEF DESCRIPTION OF THE DRAWINGS

The present invention will be described with reference to the accompanying drawings in which

FIG. 12 shows details of timing relations between the control signals shown in FIG. 11A and applied according to the prior art;

FIG. 13 shows details of timing relations between the control signals shown in FIG. 11B and applied according to the present invention;

DETAILED DESCRIPTION OF THE PRESENT INVENTION

According to the present invention, basically, in N-by-$M_R$ MIMO systems, there are $M_R$ data input streams in parallel. (Note that this means here an N transmit and $M_R$ receive antenna system and N is not equal to the number N of symbol samples to be subjected to FFT processing). For this reason, an FFT architecture is also implemented which is able to process several data streams simultaneously at a rate $M_R$ times the sample rate (of the individual data stream). (This means, a clock signal clk' supplied to an arrangement according to the present invention is $M_R$ times the clk signal applied to the prior art arrangement in terms of frequency and 1/$M_R$ times in terms of period.)

Figure 9:
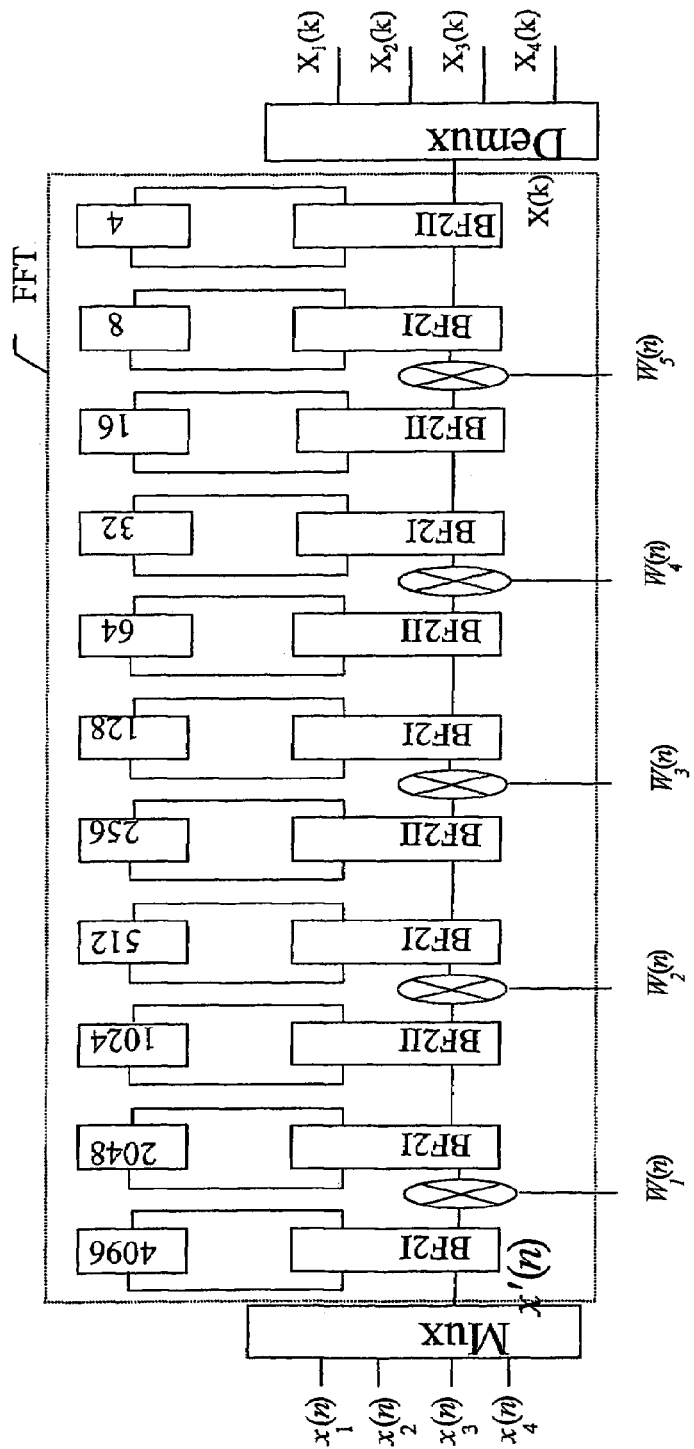
FIG. 9 shows a block circuit illustration of an embodiment of a multi-stream FFT architecture, as applicable for example to a 4 antenna MIMO receiver.
Figure 10:
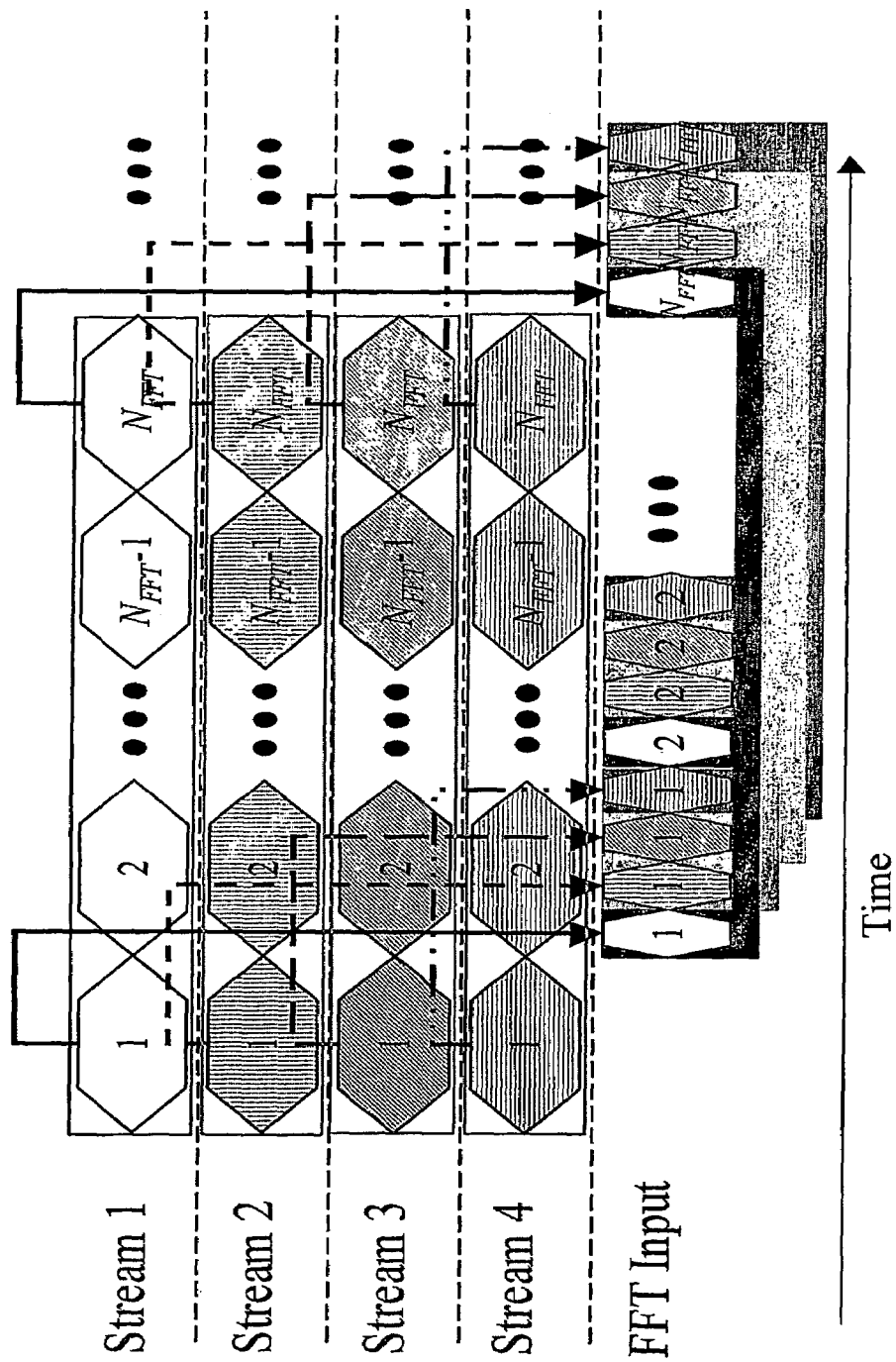
FIG. 10 shows a basic timing diagram for the FFT architecture according to the embodiment shown in FIG. 9. Note that this diagram shows the timing for the first stage for the input signal of the FFT length N only. However, the timing for the following butterfly stages can be derived based on the timing of the first stage. For this reason, according to the stage i, the N value has to be adopted to $N=2^{k-(i-1)}$.

FIG. 9 illustrates an FFT architecture for $M_R=4$ parallel data streams and FIG. 10 shows the basic timing of the signal processing, according to the present invention.

In the first step of the process, the $M_R$ ($M_R=4$) data streams $x_1(n), x_2(n), x_3(n)$ and $x_4(n)$ are multiplexed to a single stream X(n) that is directly fed to the FFT pipeline processor. For this reason, there is no need to introduce any input buffer, which would have at least a size of $M_R$ times of the number N of data samples to be subjected to FFT transformation. (N is also referred to as "FFT length".)

For the transformation of the input x'(n), the known architecture, according to the present invention, is modified in respect of the subsequently outlined aspects. Due to the four-fold amount of data (generally, $M_R$ fold) at each stage, the FIFO memory size in the feedback path of each stage is extended by factor four (generally $M_R$). In addition, since the same twiddle factors are used for each of the four streams, the twiddle factors change four times slower compared to the single stream FFT.

This means that the simple multipliers are maintained active $M_R$ times longer and also the factors W(n) are applied $M_R$ times longer.

Finally, the transformed data streams contained in an FFT output stream X(k) are demultiplexed corresponding to the multiplexing at the beginning of the FFT.

The overall memory size is $M_R(N_{FFT}-1)$. Comparing the before described successive architecture, this approach requires a significantly smaller memory size. Because of the interleaved data processing within the FFT, there is no need for buffering of the FFT inputs.

Table 2 shows the comparison of the successive multi-stream FFTs. It can be seen that the new architecture reduces the memory size of above $2.5N_{FFT}$ complex symbols at same computational complexity.

TABLE 2

| Memory consumption of the successive alternative multi-stream FFTs. | |
|---|---|
| Straightforward Successive Multi-stream FFT $M_R = 4$ $M_{FFT} = 1$ | Successive Multi-stream FFT acc. to invention $M_R = 4$ $M_{FFT} = 1$ |
| $6.5N_{FFT}-1$ | $4N_{FFT}-4$ |

FIG. 9 thus shows a signal processor for Fast Fourier Transformation, FFT, of $M_R$, $M_R>1$, input data streams $x_i(n)$. In the example shown, $M_R=4$, so that input data streams $x_1(n), \ldots, x_4(n)$ are supplied in parallel. The data streams are fed to a multiplexing device MUX having $M_R$ (here $M_R=4$) input terminals each receiving one of the $M_R$ input data streams $x1(n), \ldots, x4(n)$. At an output terminal x' (n) of the multiplexing device, the $M_R$ input data streams are output in a multiplexed manner. The multiplexed output represents an interlaced (or interleaved) output of the $M_R$ data streams, i.e. data samples of $M_{R'}$ streams are alternatingly output.

The thus obtained interlaced and/or multiplexed output data stream x'(n) is fed to a Fast Fourier Transformation device FFT. The FFT device is configured to perform Fast Fourier Transformation of a data stream x'(n) supplied at an input terminal thereof and to output the FFT transformed data stream at an output terminal X(k) thereof. Thus, the input terminal of the Fast Fourier Transformation device FFT is connected to the output terminal x'(n) of the multiplexing device MUX. The signal processor further comprises a demultiplexing device DEMUX having an input terminal connected to the output terminal X(k) of the Fast Fourier Transformation device FFT. At $M_R$ output terminals $X1(k), \ldots, X4(k)$ a respective one of $M_R$ transformed output data streams is output in a demultiplexed manner. (Note that x(n) denotes the input signal in the non-FFT transformed domain whereas X(k) denotes the resulting signal in the FFT transformed domain. In particular, k of X(k) is distinct from "k" used in connection with identifying the stages of an FFT applied.)

According to the present invention, such a FFT device is designed for each of the $M_R$ input data streams containing a number of $N=2^k$ samples. Further, the Fast Fourier Transformation device FFT has a pipeline architecture composed of k stages with a respective feedback path including a single delay element per each stage of the pipeline architecture and is controlled by internal control signals clk', s, t, and w (not all individually shown in FIG. 9). The clock signal clk' is denoted as first control signal, and control signals s', t', w' are denoted as second control signals.

According to the present invention, the delay element in a feedback path of an $i^{th}$ stage, $1<=i<=k$, of the pipeline architecture imposes a delay of $M_R*N/2'$ samples, first internal control signal clk' is clocked $M_R$ times faster compared to a supply rate/clock rate of the supplied $M_R$ streams, and the second internal control signals s', t', w' are clocked $M_R$ times slower compared to the clock rate clk' at which the FFT is operating.

In particular, the multiplexing device MUX is configured such that the $M_R$ input data streams are multiplexed per data sample of the input data streams (interlaced) and the demultiplexing device (DEMUX) is configured such that the transformed input data stream is demultiplexed per data sample of the transformed data stream (de-interlaced).

A control signal (not shown) supplied to the multiplexer and demultiplexer is clocked at a rate of $M_R*clk$, which means that it is operated at $M_R$ times the clock rate clk/sample rate of the input data streams.

In a particular advantageous embodiment of the present invention, the Fast Fourier Transformation device FFT has a Radix-2 Single-path Delay Feedback, $R^2SDF$, architecture. Also, the FFT device is clocked $M_R$ times faster than the sample rate clk of an individual data stream of N samples. In connection with an $R2^2SDF$ FFT device, the pipeline architecture of the Fast Fourier Transformation device is composed of Butterfly stages of types I and II (BF2I, BF2II).

Figure 1:
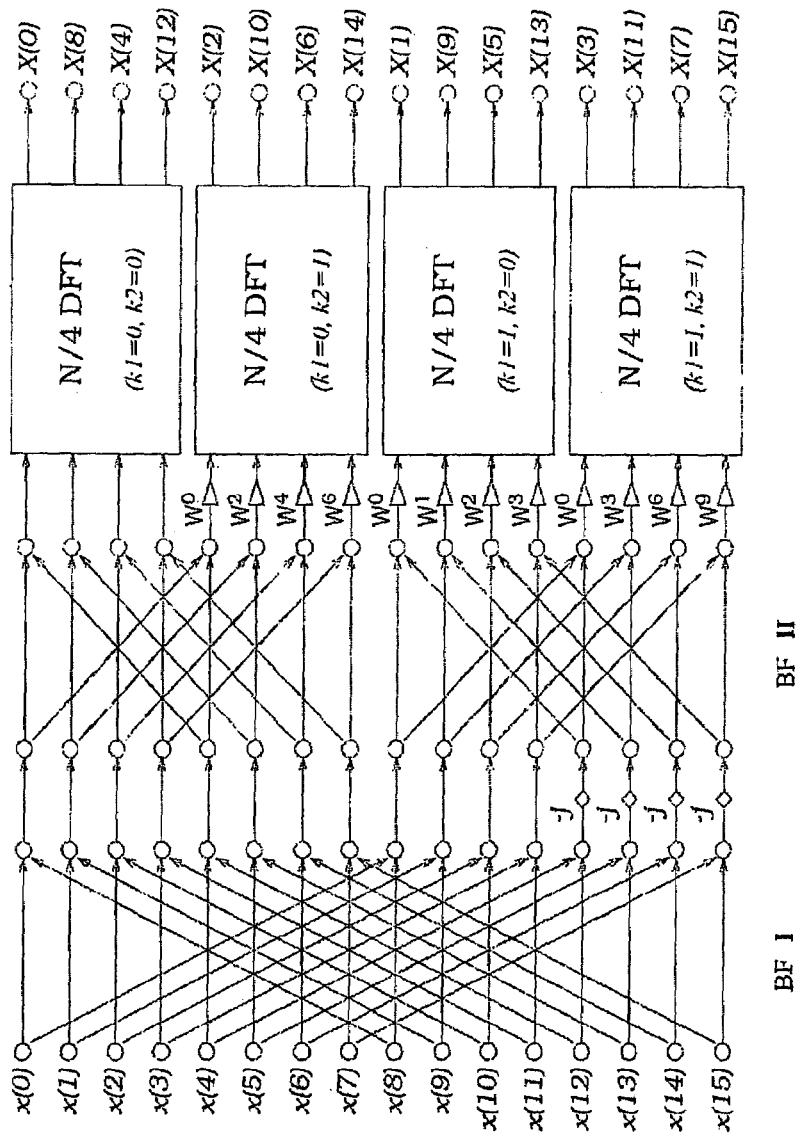
FIG. 1 shows a signal flow graph of a Butterfly structure with decomposed twiddle factors.
Figure 2:
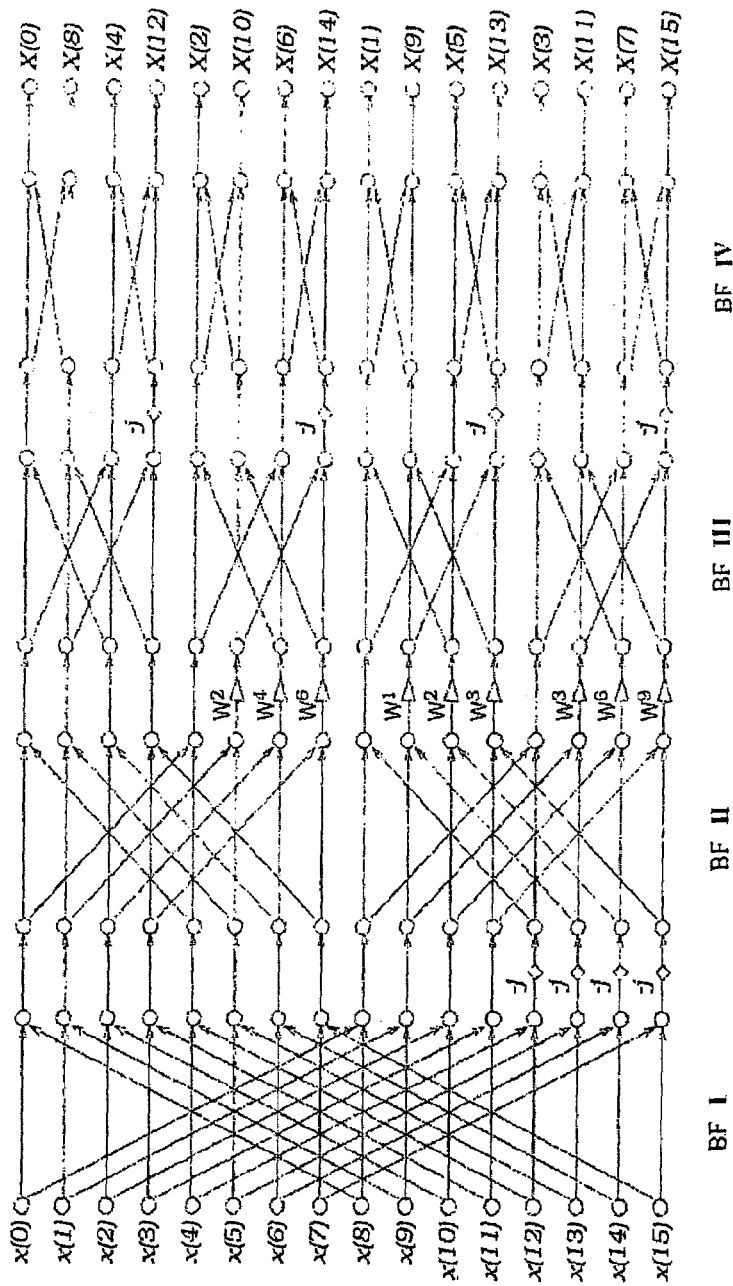
FIG. 2 shows a Radix $2^2$ DIF FFT signal flow graph for N=16 samples.
Figure 3:
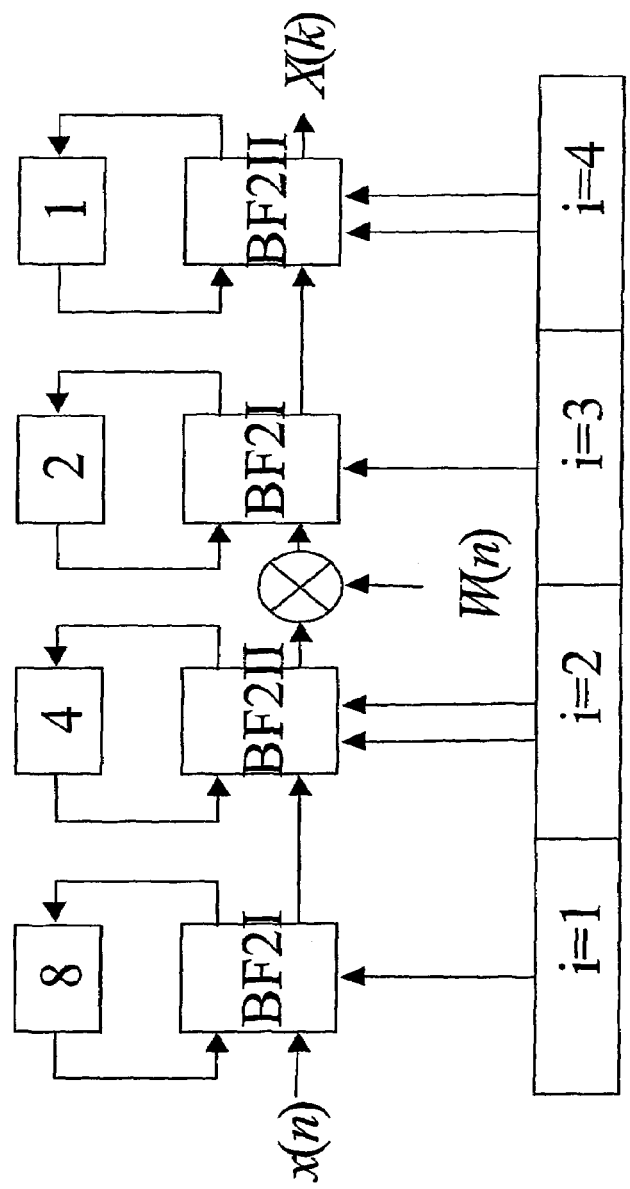
FIG. 3 shows a Radix $2^2$ SDF pipeline FFT architecture for N=16 samples.
Figure 4:
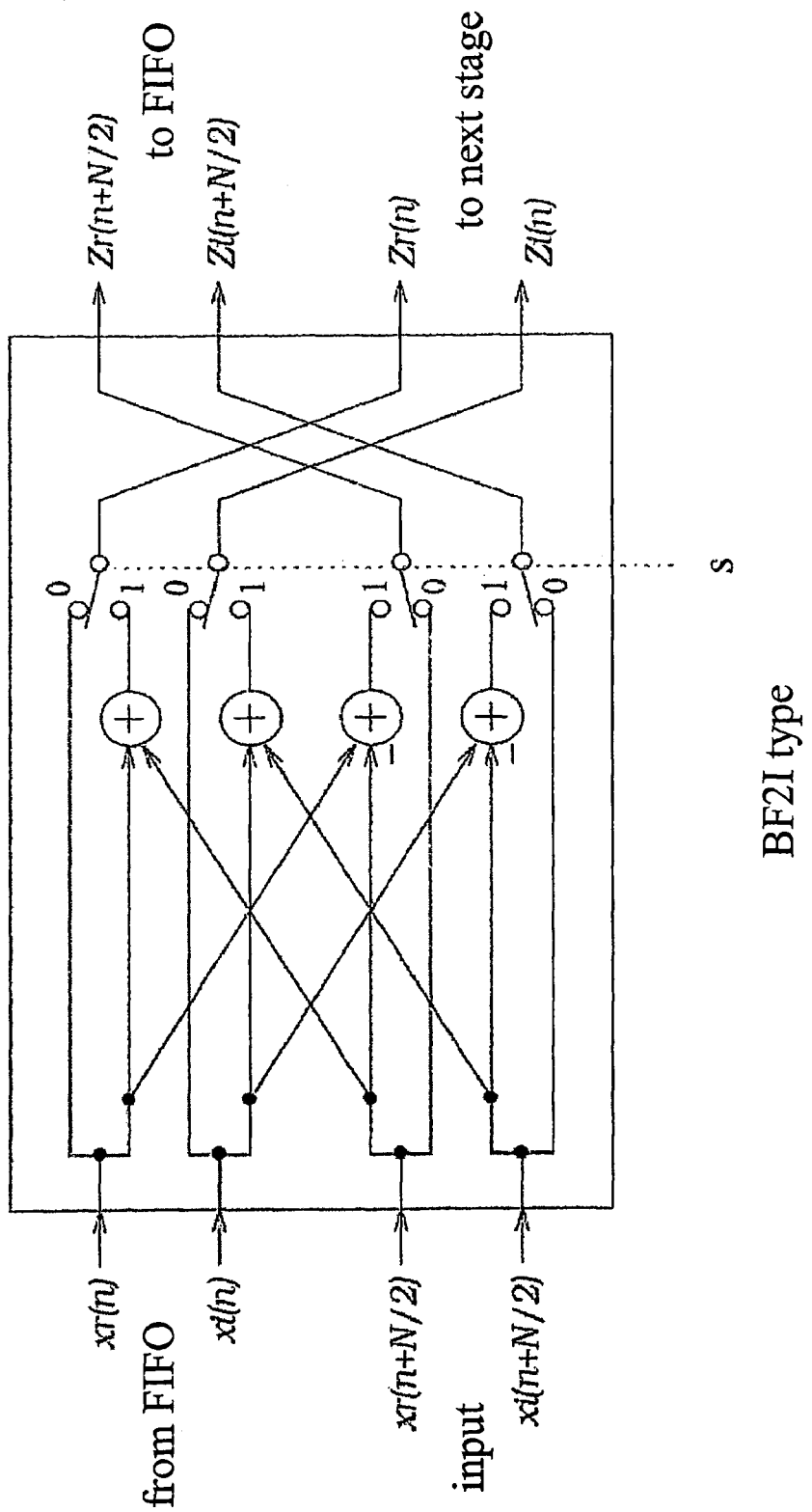
FIG. 4 shows an internal structure of a Butterfly stage of first type, BF2I, with signals input thereto being divided into real and imaginary part.
Figure 5:
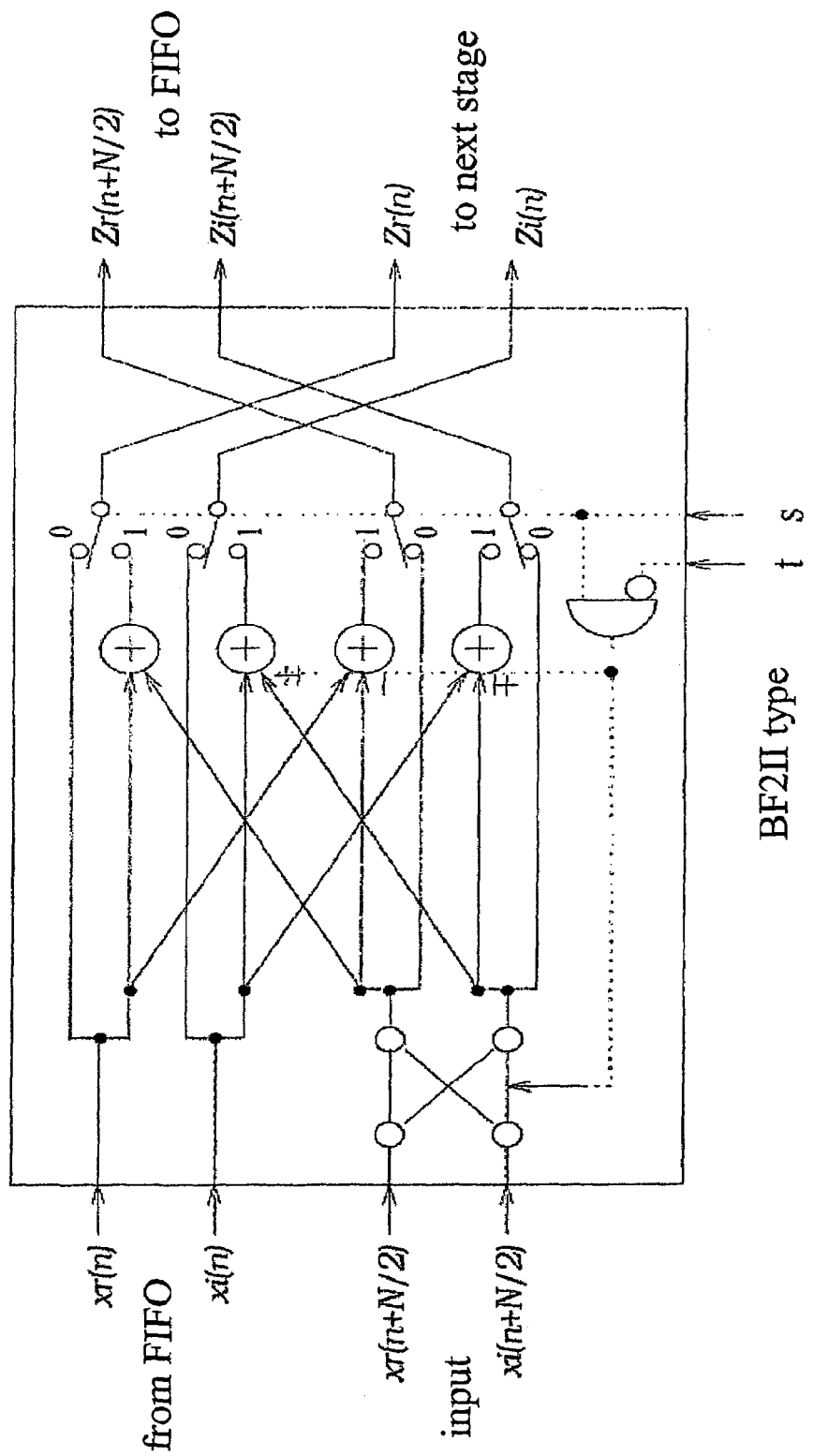
FIG. 5 shows an internal structure of a Butterfly stage of second type, BF2II, with signals input thereto being divided into real and imaginary part.
Figure 6:
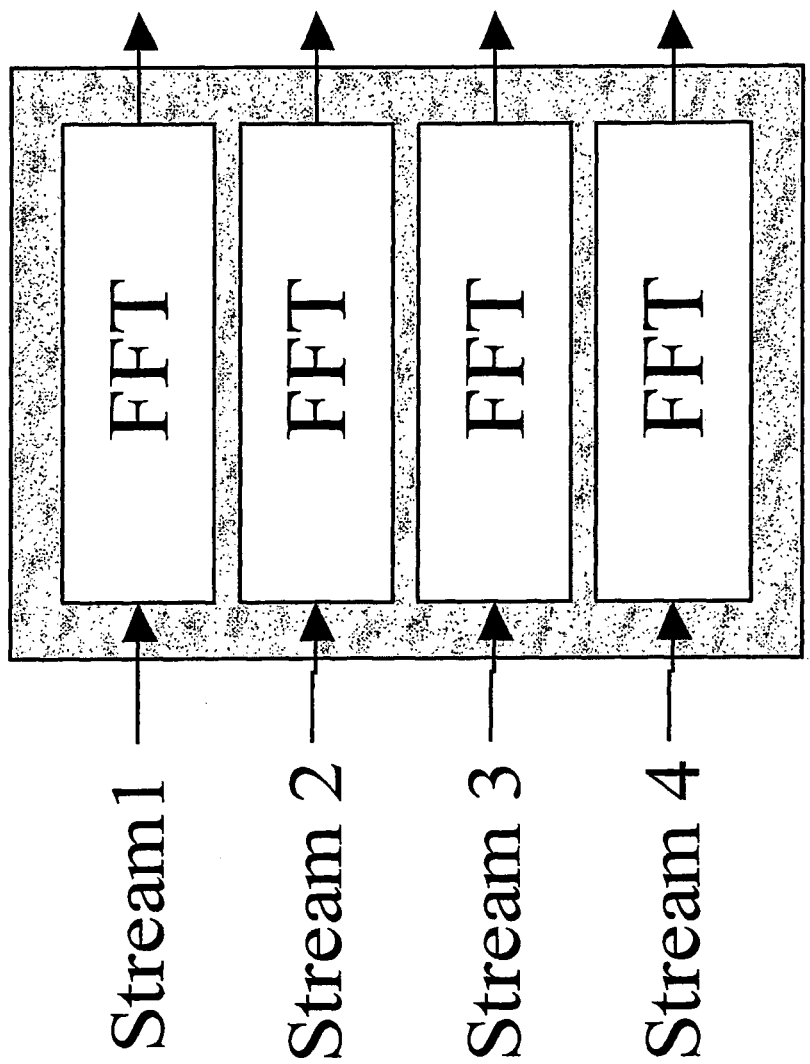
FIG. 6 shows a block circuit illustration of a parallel symbol FFT transformation architecture.

In such a case, the first (input) stage of the pipeline architecture receiving the multiplexed data streams is a Butterfly stage of type I for even and odd total numbers of stages. The internal structure and operation of BF2I and BF2II stages is as shown in FIGS. 4 and 5, and only the timing of the control signals are different in connection with the present invention.

Figure 11B:
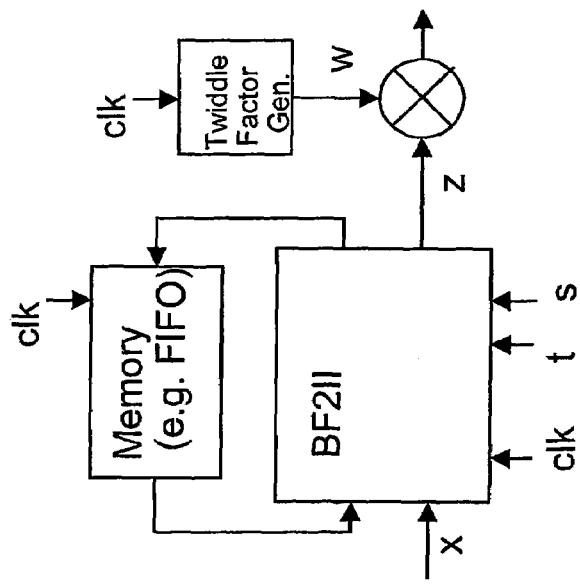
FIGS. 11A and 11B show details of the data control in terms of control signals applied to a butterfly stage of type BF2II according to prior art (FIG. 11A) and the present invention (FIG. 11B), respectively.
Figure 11A:
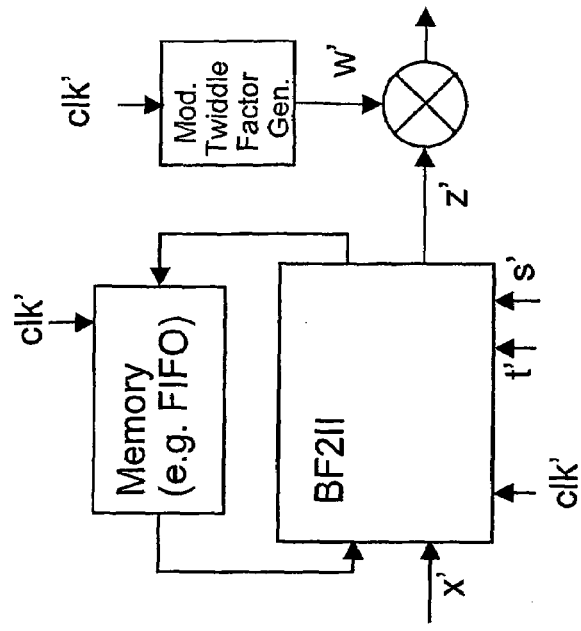

FIG. 11B shows details of control signals with a corresponding timing relation being illustrated in FIG. 13. FIG. 11B is substantially identical to FIG. 11A except that the control signals are denoted in addition with an apostrophe to make clear that the control signals applied according to the present invention differ in the timing from those applied in the prior art arrangement.

FIG. 13 shows the timing relation there between. In the lower part of FIG. 13, the signals z', w' and clk' are supplied. With each clock cycle clk', a new signal z' is supplied to the multiplier which is supplied with a corresponding weight (twiddle) factor w' which changes but after $M_R$ cycles of clk'. In the upper part of FIG. 13 it is shown that a sample x' of a respective one out of $M_R$ sequences of 1 ... N samples each (forming one OFDM symbol) is supplied with each clock cycle clk' in a multiplexed (interlaced) manner. Initially, the signal s' assumes a low level (s'=0) for the first $M_R*N/2$ samples. Thereafter, starting with the interlacing of sample $M_R*N/2+1$, it assumes a high level until $M_R*N$ samples of all streams of a symbol have been supplied. (Thereafter, a new OFDM symbol sequence starts with s'=0). As to the signal t', this signal assumes a high level for the first $M_R*3*N/4$ samples and changes afterwards (starting with interlacing of samples $3*N/4+1$) for the last $M_R*N/4$ samples to the low level.

Thus, the second internal FFT control signals s', t', w' are clocked $M_R$ times slower compared to the clock rate clk' at which the FFT is operating, and the clock rate clk' at which the FFT is operating is $M_R$ times faster than the clock rate clk at which the samples of the $M_R$ streams are supplied. Speeding the clock rate clk' at which the FFT device operates by a factor $M_R$ adjusts the FFT clock rate to the number $M_R$ of externally supplied data streams, and slowing the control signals s', t', w' down by a factor $M_R$ compensates for this by adjusting the other internal control signals of the FFT to the new clock rate clk' at which the FFT is operating.

As mentioned beforehand, it is to be noted that this diagram shows the timing for the first stage for the input signal of the FFT of length N only. However, the timing for the following butterfly stages can be derived based on the timing of the first stage. For this reason, according to the stage i, the N value (based on which the timing is indicated) has to be adopted to $N=2^{k-(i-1)}$.

Figure 14A:
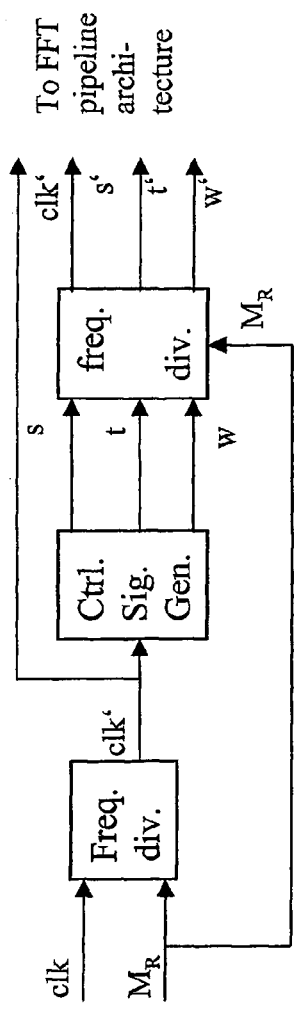
FIG. 14A shows a block circuit diagram of a control module according to the present invention.

FIG. 14A shows a block circuit diagram of a control module according to the present invention. As illustrated, a clock rate clk of the $M_R$ supplied streams is supplied to the control module as well as an information on $M_R$ as such. Both of these can be fixedly configured to the FFT device, or informed to the device during lifetime. In a first frequency division block, the first internal control signal of the FFT device clk' is generated by such that the first internal control signal (clk') is clocked $M_R$ times faster compared to a clock rate (clk) at which the samples of the $M_R$ streams are supplied. This first internal control signal is supplied to a control signal generation block of the FFT device. Based on the supplied clock signal, second internal control signals s, t, and w are generated, basically in the manner as known from the prior art for controlling the pipeline FFT architecture as described herein before, i.e based on the number of clock cycles/samples of a single stream processed. The first internal control signal clk' is also passed to the pipeline architecture.

However, due to those (intermediate) second internal control signals s, t, and w being generated based on clk', the increased frequency thereof is to be compensated. This is accomplished by a second frequency divider block. The (intermediate) second internal control signals s, t, and w are supplied thereto as well as the indication of $M_R$, and an output of the second internal control signals s', t', and w' is generated such that the second internal control signals (s', t', w') are $M_R$ times slower compared to the first internal control signal (clk'). Then, also the signals s', t', w' are supplied to the FFT pipeline architecture.

Figure 14B:
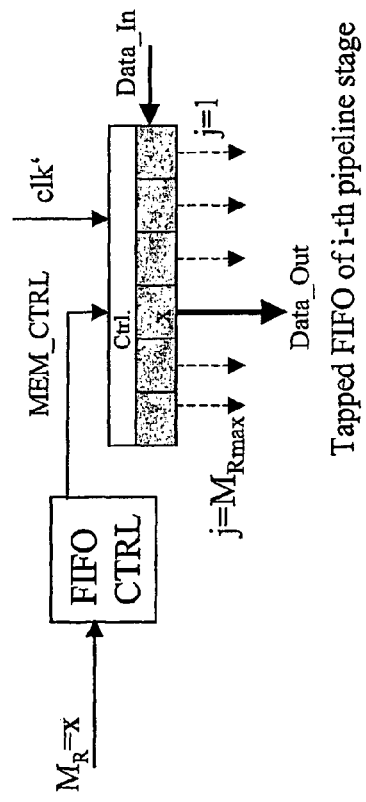
FIG. 14B shows a block circuit diagram of a modification of a control module according to the present invention.

FIG. 14B shows a block circuit diagram of a modification of a control module according to the present invention. The indication of $M_R$ streams to be processed is supplied to a FIFO Control block, where a memory control signal MEM_CTRL is generated therefrom. The signal MEM_CTRL is then supplied to the control section of e.g. a FIFO memory or any other memory having FIFO capabilities within a feedback path of a respective stage of the FFT pipeline structure. As described above, according to the present invention, a memory (e.g. FIFO) in a feedback path of the FFT pipeline imposes a delay of $M_R*N/2^i$ samples on the samples in the feedback path of an $i^{th}$ stage, $1<=i<=k$. This is based on the assumption of a fixed number of $M_R$ streams to be processed which is known beforehand, i.e. at FFT device production.

Figure 7:
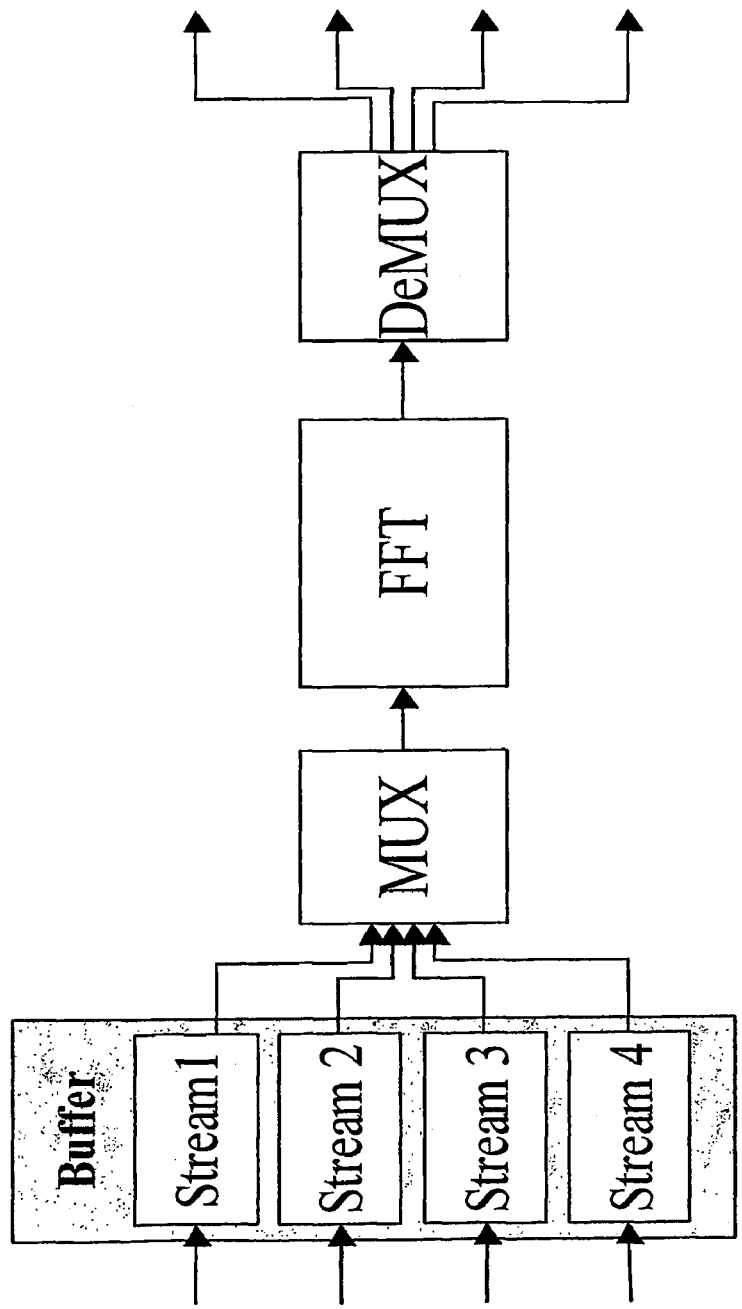
FIG. 7 shows a block circuit illustration of a successive symbol FFT transformation architecture.
Figure 8:
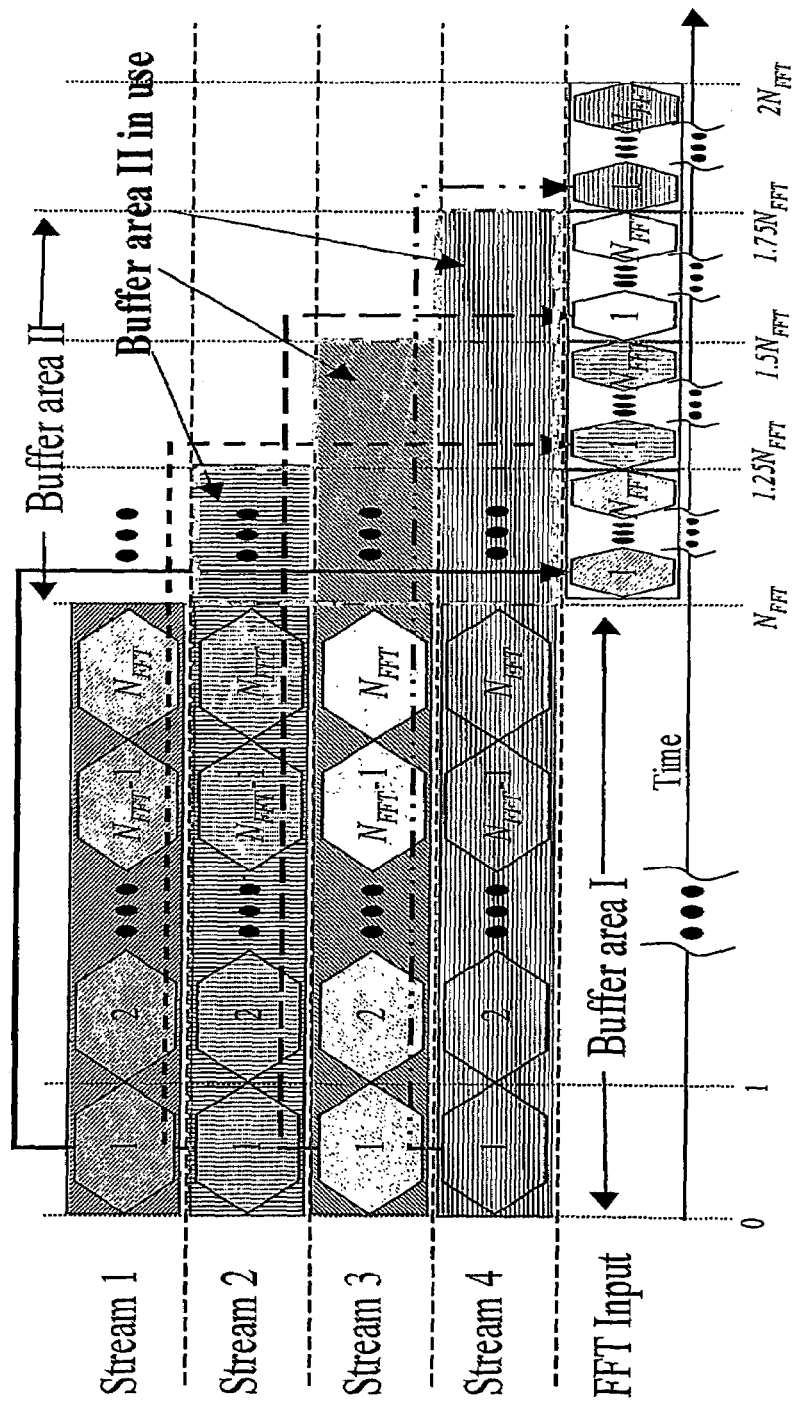
FIG. 8 shows a timing diagram for the successive FFT transformation architecture of FIG. 7. Note that this diagram shows the timing for the first stage for the input signal of the FFT length N only. However, the timing for the following butterfly stages can be derived based on the timing of the first stage. For this reason, according to the stage i, the N value has to be adopted to $N=2^{k-(i-1)}$.

FIG. 14B now illustrates an example in which a FIFO or any other memory is composed of a number of $j=1 \ldots M_{Rmax}$ memory cells, each comprising $N/2^i$ memory locations for data samples to be buffered. By virtue of the control signal MEM_CTRL, a number of $M_R=X$ cells can be selected to be actively used in the FIFO. Hence, data supplied at clock rate clk' are output in a FIFO manner after $M_R=X$ memory cells. This can be regarded as a FIFO than can be "tapped" dependent on the control signal MEM_CTRL. Such feature provides for increased flexibility of application of the FFT structure in various environments, including SISO ($M_R=1$) as well as MIMO applications ($M_R=2 \ldots M_{Rmax}$). The parameter $M_R$ could be configured upon installation of the FFT device, or could be transmitted in a special signal (e.g. broadcast signal) and then detected at the FFT device for self-configuration (or self-reconfiguration) of the device. The only additional memory requirement would reside in the feedback paths, but no buffers as discussed in connection with the approach shown in FIGS. 7 and 8 are needed.

Figure 15:
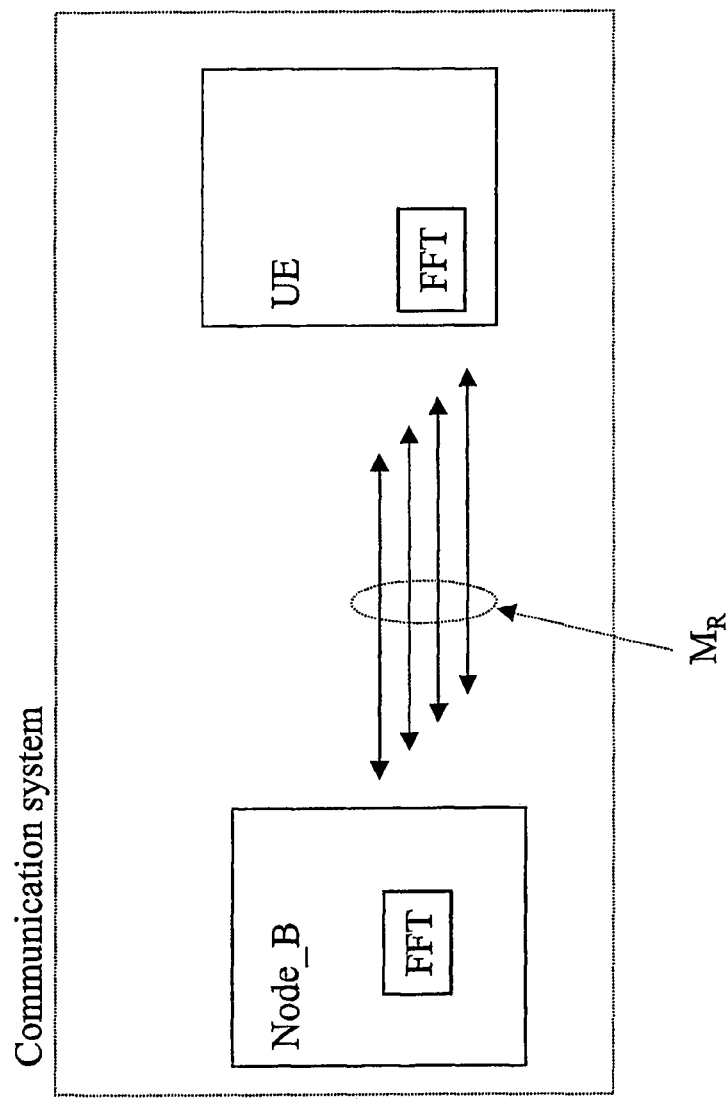
FIG. 15 shows parts of a system comprising at least one terminal and at least one network element each of which incorporates the FFT according to the present invention.

A signal processor according to any of the preceding described aspects can advantageously form part of a network element of a communication network. Still further, a signal processor according to any of the preceding described aspects can advantageously form part of a terminal configured to communicate via a communication network. Hence, the present invention also addresses a system comprising at least one such a terminal and at least one such network element, as shown in outline in FIG. 15. FIG. 15 shows an FFT according to the present invention being implemented in a MIMO OFDM system comprising a Node_B as a network element and a user equipment UE as a terminal. As illustrated by the four ($M_R$=4) arrows, these communicate in a MIMO scenario and in the illustrated example system, each of them includes an FFT according to the present invention. (Details of the FFT can be found in the respective other figures of this application. Note that other components of a terminal and a network element are not shown as they are not essential for the present invention.)

Hereinbefore, the present invention has mainly been described with reference to a hardware implementation as e.g. usable in an ASIC (Application Specific Integrated Circuit) or DSP (Digital Signal processor). The signal processor can also be a signal processing device implemented as a chip in semiconductor technology such as CMOS, BiCMOS, or any other.

For a specific implementation of the invention, it is not considered essential whether the invention is embodied as a chip, as a signal processor device or as software code portions as all these implementations are equally well applicable and chosen according to the circumstances under which the present invention is to be carried out. Thus, whether a terminal or network element embodies the invention as software code portion or as a chip or as a signal processor device is not in the focus of the present application.

Nevertheless, the present invention may also be carried out in terms of a signal processing method as software code portions running on a processor, or stored on a storage medium and thus adapted to carry out the method when run on a processor.

In this regard, its is to be understood that the present invention concerns a signal processing method for performing Fast Fourier Transformation, FFT, of $M_R$, $M_R$>1, input data streams (x1(n), . . . , $x_{M^R}$(n)) supplied in parallel, comprising the steps of multiplexing the $M_R$ input data streams (x1(n), . . . , $x_{M^R}$(n)) to a multiplexed data stream, performing Fast Fourier Transformation of the multiplexed data stream and outputting the transformed data stream, demultiplexing the transformed data stream to $M_R$ transformed output data streams, characterized by each of the $M_R$ input data streams contains a number of N=$2^k$ samples, performing FFT transformation using a pipeline of k stages with a respective feedback path imposing a delay on the samples per each stage of the pipeline and controlling the performing of the FFT transformation by a first (clk') and second internal control signals (s', t', w'), and by imposing a delay of $M_R$*N/$2^i$ samples on the samples in the feedback path of an $i^{th}$ stage, 1<=i<=k, of the pipeline, clocking the first internal control signal (clk') $M_R$ times faster compared to a clock rate (clk) at which the samples of the $M_R$ streams are supplied, and clocking the second internal control signals (s', t', w') $M_R$ times slower compared to the first internal control signal (clk').

Under the aspect of the method, multiplexing is accomplished such that the $M_R$ input data streams are multiplexed per data sample of the input data streams and demultiplexing is accomplished such that the transformed data stream is demultiplexed per data sample of the transformed data stream. Clocking to the multiplexer and demultiplexer is performed at a rate of $M_R$*N, i.e. $M_R$ times the sample rate of an individual data stream. The Fast Fourier Transformation processing is based on a Radix-2 Single-path Delay Feedback algorithm, wherein the pipeline of processing stages for the Fast Fourier Transformation is composed of Butterfly stages of types I and II (BF2I, BF2II).

In this connection, the first of k stages of the pipeline receiving the multiplexed data stream is a Butterfly stage of type I for even and odd total numbers of k.

Accordingly, as has been described herein above, the present invention proposes a signal processor for Fast Fourier Transformation, FFT, of $M_R$, $M_R$>1, input data streams of $2^k$ samples each, supplied in parallel. After multiplexing the input data streams in an interlaced manner, the resulting stream is subjected to FFT. The FFT device has a pipeline architecture composed of k stages with a respective feedback path including a single delay element per each stage of the pipeline architecture. The delay element and timing signals are adapted to cope with FFT processing of the multiplexed streams using the single FFT device only. After processing, the FFT processed data stream is demultiplexed.

Although the invention has been described in the context of particular embodiments, various modifications are possible without departing from the scope and spirit of the invention as defined by the appended claims.

It should be appreciated that whilst embodiments of the present invention have mainly been described in relation to mobile communication devices such as mobile stations, embodiments of the present invention may be applicable to other types of communication devices that may access communication networks. Furthermore, embodiments may be applicable to other appropriate communication systems, even if reference has mainly been made to mobile communication systems.

| List of abbreviations: | |
|---|---|
| OFDM | Orthogonal Frequency Division Multiplex |
| SISO | Single Input Single Output |
| MIMO | Multiple Input Multiple Output |
| FFT | Fast Fourier Transformation |
| BF | Butterfly |
| CFA | Common Factor Algorithm |
| DIF | Decimation-In-Frequency |
| SFG | Signal Flow Graph |
| SDF | Single-Path Delay Feedback |

The invention claimed is:
1. An apparatus, comprising;
a multiplexing device comprising $M_R$, $M_R$>1, input terminals each receiving one of $M_R$ input data streams supplied in parallel, and an output terminal at which the $M_R$ input data streams are output in a multiplexed manner;
a fast fourier transformation device configured to perform fast fourier transformation of a data stream supplied at an input terminal thereof and to output the fast fourier transformation transformed data stream at an output terminal thereof, the input terminal of the fast fourier trans- formation device being connected to the output terminal of the multiplexing device; and a demultiplexing device comprising an input terminal connected to the output terminal of the fast fourier transformation device and $M_R$ output terminals at which a respective one of $M_R$ transformed output data streams is output in a demultiplexed manner, wherein each of the $M_R$ input data streams contains a number of $N=2^k$ samples, the fast fourier transformation device has a pipeline architecture composed of k stages with a respective feedback path including a single delay element per each stage of the pipeline architecture and is controlled by a first and second internal control signals, the delay element in a feedback path of an $i^{th}$ stage, $1<=i<=k$, of the pipeline architecture imposes a delay of $M_R*N/2^i$ samples, the first internal control signal is clocked $M_R$ times faster compared to a clock rate at which the samples of the $M_R$ streams are supplied, and the second internal control signals are clocked $M_R$ times slower compared to the first internal control signal).

2. The apparatus according to claim 1, wherein the multiplexing device is configured such that the $M_R$ input data streams are multiplexed per data sample of the input data streams, and the demultiplexing device is configured such that the transformed input data stream is demultiplexed per data sample of the transformed data stream.

3. The apparatus according to claim 2, wherein a control signal supplied to the multiplexer and demultiplexer is clocked at a rate $M_R$ times the clock rate of the supplied streams.

4. The apparatus according to claim 1, wherein the fast fourier transformation device has a radix-2 single-path delay feedback architecture.

5. The apparatus according to claim 4, wherein the pipeline architecture of the fast fourier transformation device is composed of butterfly stages of types I and II.

6. The apparatus according to claim 5, wherein the first stage of the pipeline architecture receiving the multiplexed data streams is a butterfly stage of type I for even and odd total numbers of k.

7. A network element comprising:

a multiplexing device comprising $M_R$, $M_R>1$, input terminals each receiving one of $M_R$ input data streams supplied in parallel, and an output terminal at which the $M_R$ input data streams are output in a multiplexed manner;

a fast fourier transformation device configured to perform fast fourier transformation of a data stream supplied at an input terminal thereof and to output the fast fourier transformation transformed data stream at an output terminal thereof, the input terminal of the fast fourier transformation device being connected to the output terminal of the multiplexing device; and a demultiplexing device comprising an input terminal connected to the output terminal of the fast fourier transformation device and $M_R$ output terminals at which a respective one of $M_R$ transformed output data streams is output in a demultiplexed manner, wherein each of the $M_R$ input data streams contains a number of $N=2^k$ samples, the fast fourier transformation device has a pipeline architecture composed of k stages with a respective feedback path including a single delay element per each stage of the pipeline architecture and is controlled by a first and second internal control signals, the delay element in a feedback path of an $i^{th}$ stage, $1<=i<=k$, of the pipeline architecture imposes a delay of $M_R*N/2^i$ samples, the first internal control signal is clocked $M_R$ times faster compared to a clock rate at which the samples of the $M_R$ streams are supplied, and the second internal control signals are clocked $M_R$ times slower compared to the first internal control signal.

8. A terminal comprising:

a multiplexing device comprising $M_R$ $M_R>1$ input terminals each receiving one of $M_R$ input data streams supplied in parallel, and an output terminal at which the $M_R$ input data streams are output in a multiplexed manner;

a fast fourier transformation device configured to perform fast fourier transformation of a data stream supplied at an input terminal thereof and to output the fast fourier transformation transformed data stream at an output terminal thereof, the input terminal of the fast fourier transformation device being connected to the output terminal of the multiplexing device; and a demultiplexing device comprising an input terminal connected to the output terminal of the fast fourier transformation device and $M_R$ output terminals at which a respective one of $M_R$ transformed output data streams is output in a demultiplexed manner, wherein each of the $M_R$ input data streams contains a number of $N=2^k$ samples, the fast fourier transformation device has a pipeline architecture composed of k stages with a respective feedback path including a single delay element per each stage of the pipeline architecture and is controlled by a first and second internal control signals, the delay element in a feedback path of an $i^{th}$ stage, $1<=i<=k$, of the pipeline architecture imposes a delay of $M_R*N/2^i$ samples, the first internal control signal is clocked $M_R$ times faster compared to a clock rate at which the samples of the $M_R$ streams are supplied, and the second internal control signals are clocked $M_R$ times slower compared to the first internal control signal.

9. A method comprising:

multiplexing $M_R$, $M_R>1$, input data streams supplied in parallel to a multiplexed data stream;

performing fast fourier transformation of the multiplexed data stream and outputting the transformed data stream;

demultiplexing the transformed data stream to $M_R$ transformed output data streams, wherein each of the $M_R$ input data streams contains a number of $N=2^k$ samples;

performing fast fourier transformation using a pipeline of k stages with a respective feedback path imposing a delay on the samples per each stage of the pipeline;

controlling the performing of the fast fourier transformation by a first and second internal control signals and by imposing a delay of $M_R*N/2^i$ samples on the samples in the feedback path of an $i^{th}$ stage, $1<=i<=k$, of the pipeline;

clocking the first internal control signal $M_R$ times faster compared to a clock rate at which the samples of the $M_R$ streams are supplied; and clocking the second internal control signals $M_R$ times slower compared to the first internal control signal.

10. A method according to claim 9, wherein
multiplexing is accomplished such that the $M_R$ input data streams are multiplexed per data sample of the input data streams, and
demultiplexing is accomplished such that the transformed data stream is demultiplexed per data sample of the transformed data stream.

11. A method according to claim 10, wherein
clocking to the multiplexer and demultiplexer is performed at a rate $M_R$ times the clock rate of the supplied streams.

12. A method according to claim 9, wherein
the fast fourier transformation processing is based on a radix-2 single-path delay feedback algorithm.

13. A method according to claim 12, wherein
the pipeline of processing stages for the fast fourier transformation is composed of butterfly stages of types I and II.

14. A method according to claim 13, wherein
the first stage of the pipeline receiving the multiplexed data stream is a butterfly stage of type I for even and odd total numbers of k.

15. A computer chip comprising:
a multiplexing device comprising $M_R$, $M_R>1$ input terminals each receiving one of $M_R$ input data streams supplied in parallel, and an output terminal at which the $M_R$ input data streams are output in a multiplexed manner;
a fast fourier transformation device configured to perform fast fourier transformation of a data stream supplied at an input terminal thereof and to output the fast fourier transformation transformed data stream at an output terminal thereof, the input terminal of the fast fourier transformation device being connected to the output terminal of the multiplexing device; and
a demultiplexing device comprising an input terminal connected to the output terminal of the fast fourier transformation device and $M_R$ output terminals at which a respective one of $M_R$ transformed output data streams is output in a demultiplexed manner,
wherein
each of the $M_R$ input data streams contains a number of $N=2^k$ samples,
the fast fourier transformation device has a pipeline architecture composed of k stages with a respective feedback path including a single delay element per each stage of the pipeline architecture and is controlled by a first and second internal control signals,
the delay element in a feedback path of an $i^{th}$ stage, $1<=i<=k$, of the pipeline architecture imposes a delay of $M_R*N/2^i$ samples,
the first internal control signal is clocked $M_R$ times faster compared to a clock rate at which the samples of the $M_R$ streams are supplied, and
the second internal control signals are clocked $M_R$ times slower compared to the first internal control signal.

16. A computer program, embodied on a machine-readable medium, said computer program configured to control a processor to perform a method comprising:
multiplex the $M_R$, $M_R>1$, input data streams to a multiplexed data stream;
performing fast fourier transformation of the multiplexed data stream and outputting the transformed data stream;
demultiplexing the transformed data stream to $M_R$ transformed output data streams, wherein each of the $M_R$ input data streams contains a number of $N=2^k$ samples;
performing fast fourier transformation using a pipeline of k stages with a respective feedback path imposing a delay on the samples per each stage of the pipeline;
controlling the performing of the fast fourier transformation by a first and second internal control signals and by imposing a delay of $M_R*N/2^i$ samples on the samples in the feedback path of an $i^{th}$ stage, $1<=i<=k$, of the pipeline;
clocking the first internal control signal $M_R$ times faster compared to a clock rate at which the samples of the $M_R$ streams are supplied; and
clocking the second internal control signals $M_R$ times slower compared to the first internal control signal.

17. An apparatus, comprising:
multiplexing means for multiplexing the $M_R$, $M_R>1$, input data streams supplied in parallel to a multiplexed data stream;
first fast fourier transformation means for performing fast fourier transformation of the multiplexed data stream and outputting the transformed data stream;
demultiplexing means for demultiplexing the transformed data stream to $M_R$ transformed output data streams, wherein each of the $M_R$ input data streams contains a number of $N=2^k$ samples;
second fast fourier transformation means for performing fast fourier transformation using a pipeline of k stages with a respective feedback path imposing a delay on the samples per each stage of the pipeline;
controlling means for controlling the performing of the fast fourier transformation by a first and second internal control signals and by imposing a delay of $M_R*N/2^i$ samples on the samples in the feedback path of an $i^{th}$ stage, $1<=i<=k$, of the pipeline;
first clocking means for clocking the first internal control signal $M_R$ times faster compared to a clock rate at which the samples of the $M_R$ streams are supplied; and
second clocking means for clocking the second internal control signals $M_R$ times slower compared to the first internal control signal.

18. A system comprising:
a terminal configured to communicate via a communication network, the terminal comprising a signal processor configured for fast fourier transformation of $M_R$, $M_R<1$, input data streams supplied in parallel,
wherein the signal processor comprises
a multiplexing device comprising $M_R$ input terminals each receiving one of the $M_R$ input data streams, and an output terminal at which the $M_R$ input data streams are output in a multiplexed manner;
a fast fourier transformation device configured to perform fast fourier transformation of a data stream supplied at an input terminal thereof and to output the fast fourier transformation transformed data stream at an output terminal thereof, the input terminal of the fast fourier transformation device being connected to the output terminal of the multiplexing device; and
a demultiplexing device comprising an input terminal connected to the output terminal of the fast fourier transformation device and $M_R$ output terminals at which a respective one of $M_R$ transformed output data streams is output in a demultiplexed manner, wherein
each of the $M_R$ input data streams contains a number of $N=2^k$ samples,
the fast fourier transformation device has a pipeline architecture composed of k stages with a respective feedback path including a single delay element per each stage of the pipeline architecture and is controlled by a first and second internal control signals, the delay element in a feedback path of an $i^{th}$ stage, 1<=i<=k, of the pipeline architecture imposes a delay of $M_R*N/2^i$ samples, the first internal control signal is clocked $M_R$ times faster compared to a clock rate at which the samples of the $M_R$ streams are supplied, and the second internal control signals are clocked $M_R$ times slower compared to the first internal control signal.

19. A system comprising:

a network element, the network element comprising a signal processor configured for fast fourier transformation of $M_R$ $M_R$<1, input data streams supplied in parallel, wherein the signal processor comprises a multiplexing device comprising $M_R$ input terminals each receiving one of the $M_R$ input data streams, and an output terminal at which the $M_R$ input data streams are output in a multiplexed manner;

a fast fourier transformation device configured to perform fast fourier transformation of a data stream supplied at an input terminal thereof and to output the fast fourier transformation transformed data stream at an output terminal thereof, the input terminal of the fast fourier transformation device being connected to the output terminal of the multiplexing device; and a demultiplexing device comprising an input terminal connected to the output terminal of the fast fourier transformation device and $M_R$ output terminals at which a respective one of $M_R$ transformed output data streams is output in a demultiplexed manner, wherein each of the $M_R$ input data streams contains a number of $N=2^k$ samples, the fast fourier transformation device has a pipeline architecture composed of k stages with a respective feedback path including a single delay element per each stage of the pipeline architecture and is controlled by a first and second internal control signals, the delay element in a feedback path of an $i^{th}$ stage, 1<=i<=k, of the pipeline architecture imposes a delay of $M_R*N/2^i$ samples, the first internal control signal is clocked $M_R$ times faster compared to a clock rate at which the samples of the $M_R$ streams are supplied, and the second internal control signals are clocked $M_R$ times slower compared to the first internal control signal.

* * * * *